United States Patent Office 3,232,652
Patented Feb. 1, 1966

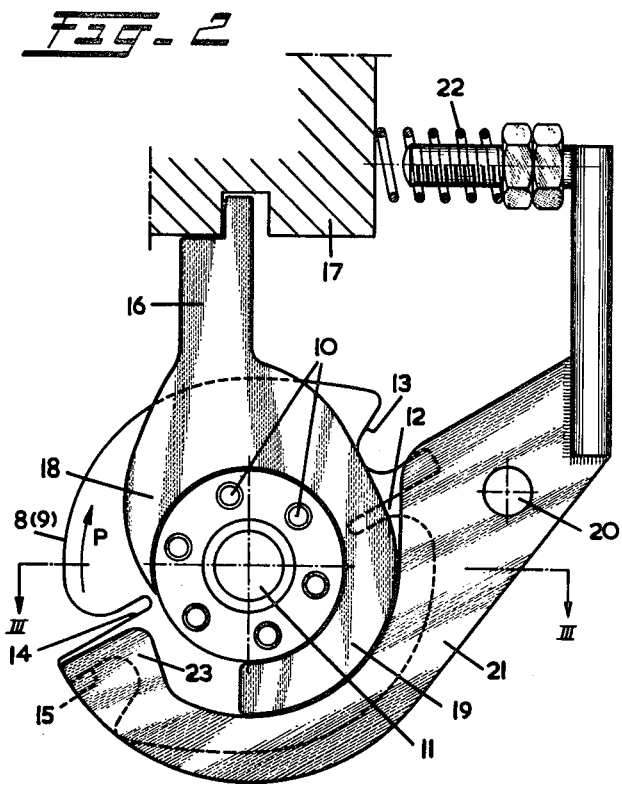
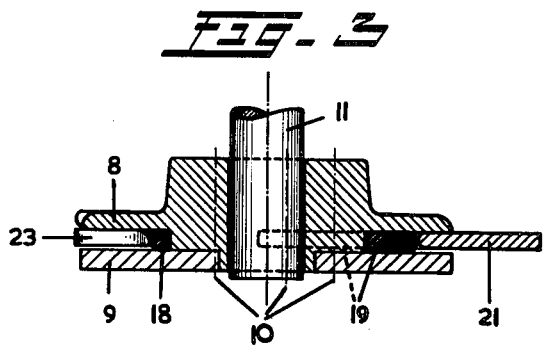

3,232,652
CORD HOLDER FOR A KNOTTER FOR A BALING PRESS
Jan Bonga, Broningen, Netherlands, assignor to Ter Borg & Mensinga's Maschinenfabrik N.V., Appingedam, Netherlands, a corporation of the Netherlands
Filed Apr. 15, 1964, Ser. No. 359,967
1 Claim. (Cl. 289—14)

This invention relates to a cord holder for a knotter for a baling press, comprising two interconnected clamping disks mounted in side-by-side relationship for stepwise rotation about the same shaft and each provided with two pairs of diametrically opposite, marginal recesses, a strickle member mounted between said disks, and a clamping plate mounted for rocking movement about a fixed point.

A cord holder of this type, which is known in the art, has various drawbacks, as the most important one must be regarded that when a knot is laid in the superposed parts of a cord or twine lapped about a bale, one part forming the end of the cord, and the other part passing into the remainder of the cord, the part which forms the end of the cord often slips off the cord holder, as a result of which it is not knotted with the other part passing into the remainder of the cord, so that no knot is formed in the superposed ends of the tie about the bale and, consequently, after the cord has been cut, a cord lapped about the bale will fall off the bale. It also often happens, however, that a proper knot is made in the superposed parts of the cord lapped about the bale, but one of the ends get jammed in the cord holder, so that when the bale is discharged the knot is pulled loose and the tie is undone.

It is an object of the present invention to avoid these drawbacks by an improved construction of a cord holder of the subject type.

To this effect, according to the invention, the strickle member is provided with a clamping arm whose outward edge, which has its centre of curvature located in the axis of revolution of the clamping disks and extends up to the vicinity of the bottom of the shallower marginal recesses of the clamping disks, forms one half of a pair of clamping jaws, the other half of which consists of the inward edge of the clamping plate, which is shaped to match the edge of the clamping arm and is biased towards the latter under the action of a spring.

One embodiment of the invention will be described, by way of example, with reference to the accompanying drawings, in which FIG. 1 is a diagrammatic front elevation of the knotter with cord holder;

FIG. 2 is a view of the cord holder on a larger scale, the upper clamping disk being removed;

FIG. 3 is a cross-sectional view of the cord holder, taken on the line III—III in FIG. 2.

Figure 1:
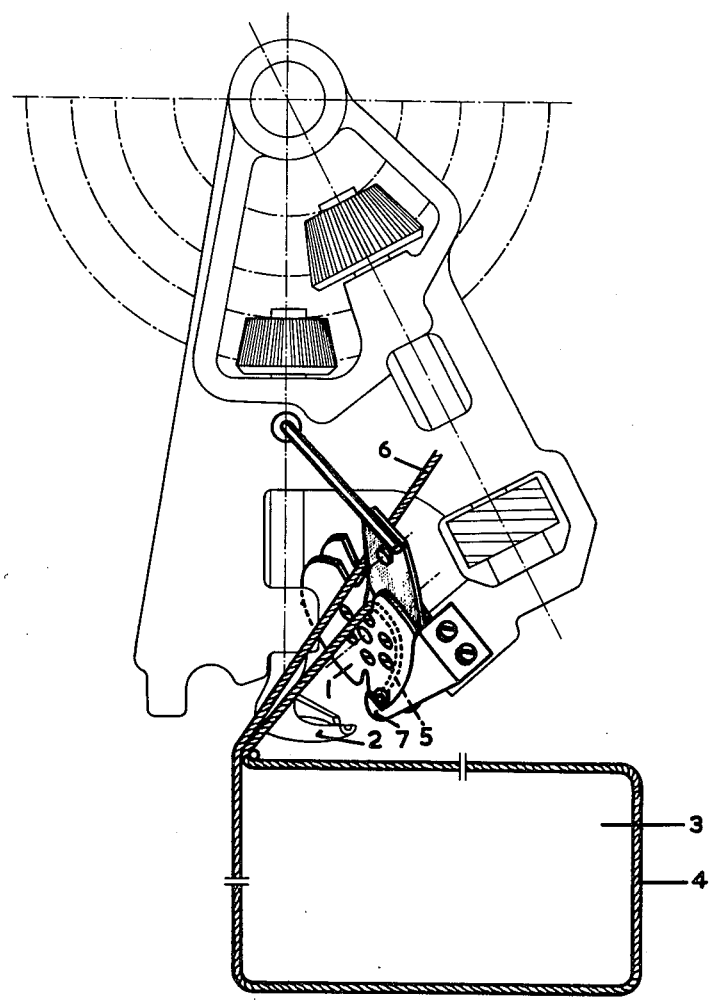

Referring to FIG. 1, the knotter comprises a cord holder 1 and a pair of knotter jaws 2, as well as means for periodically activating these parts once a formed bale 3 is surrounded by a cord 4, the loose end 5 of which is retained by the cord holder 1, and the end 6 of which still connected with the supply of cord, is laid by the twine needle in the appropriate marginal recesses of the clamping disks of the cord holder 1. The knotter is further equipped with a knife 7 for severing the cord after it has been tied about a bale.

Referring to FIGS. 2 and 3, the cord holder comprises two co-axial clamping disks 8 and 9 interconnected by capscrews 10 and fixedly mounted on a drive shaft 11. The clamping disks 8 and 9 are each provided with two pairs of diametrically opposite marginal recesses 12, 13 and 14, 15, of which the recesses 12 and 14, which are leading in the direction of rotation P of the clamping disks 8 and 9, are deep and narrow, and the trailing recesses 13 and 15 are shallow and wide.

Extending between the clamping disks 8 and 9 is a portion of a strickle member 16, the free end of which is stationarily supported by the frame 17 of the knotter, and the strickle section 18 of which serves for removing fluff from the space between the clamping disks 8 and 9. The strickle member 16 further carries a clamping arm 19, which extends between the clamping disks 8 and 9 and bears against the hub of these disks. The outward edge of the clamping arm 19, which has its centre of curvature located in the axis of the drive shaft 11, extends up to the bottom of the marginal recesses 13, 15 and forms one half of a clamp, the other half of which consists of a clamping plate 21 mounted for rocking movement about a stationary shaft 20, and having its inward edge shaped to match the outward edge of the clamping arm 19. The clamping plate 21 is biased against the clamping arm 19 by a compression spring 22 supported against the frame 17. The free end of the clamping plate 21 is provided with a clamping nose 23 which, in the home position of the clamping plate 21, extends beyond the bottom of the marginal recesses 13, 15 into the space between the clamping disks 8, 9.

The operation of the cord holder will now be described, starting from the home position of the knotter shown in FIGS. 1 and 2, the loose end 5 of the cord 4 lying in the narrow marginal recesses 12 and in the wide marginal recesses 15. By virtue of the end of the cord being pushed by the clamping nose 23 of the clamping plate 21 beyond the bottom of the marginal recesses 15 into the space between the clamping disks 8 and 9, the loose end 5 of the cord 4 is sufficiently firmly retained, partly by the clamping action exerted on it in the marginal recesses 12, to enable the bale 3 to be formed and then, by means of the twine needle, to be tied, and the end 6 of the cord to be laid in the marginal recesses 13. When the knotter is thereupon activated, the clamping disks 8 and 9 are turned through 180° in the direction of the arrow P. After a turn through about 15° the extremity of the loose end 5 of the cord has already passed the clamping nose 23 of the clamping plate 21, as a result of which the clamping nose 23 has lost its grip on the loose end 5 of the cord. Meanwhile, however, as the clamping disks 8 and 9 rotate the two ends 5 and 6 have been gripped between the facing edges of the clamping arm 19 and the clamping plate 21. The clamping action exerted on the ends 5 and 6 of the cord by the clamping arm 19 and the clamping plate 21 is fully maintained during the further rotation of the clamping disks 8 and 9 and when the knotter jaws 2 become active until the marginal edges 12 pass the end of the clamping arm 19, while, during the completion of the knot, the loose end 5 of the cord still encounters sufficient resistance in the marginal recesses 12.

This ensures that, after completion of the work cycle of the knotter, the cutting of the cord 6 by the blade 7, and the return of the twine needle to its home position, during which movement the cord is laid in the marginal recesses 14, a reliable knot has been formed in the cord tied about the bale, despite the tension present therein, and the knotter is ready for a next work cycle.

I claim:

A cord holder for a knotter for a baling press comprising two interconnected clamping disks mounted in side-by-side relationship for stepwise rotation about the same shaft and each provided with two pairs of diametrically opposite, marginal recesses, a strickle member mounted between said disks, and a clamping plate mounted for rocking movement about a fixed point, wherein said strickle member is provided with a clamping arm whose outward edge, which has its centre of curvature located in the axis of rotation of the clamping disks and extends up to the vicinity of the bottom of the shallower marginal recesses of the clamping disks, forms one half of a pair of clamping jaws, the other half of which consists of the inward edge of the clamping plate, which is shaped to match the edge of the clamping arm and is biased towards the latter under the action of a spring.

References Cited by the Examiner

UNITED STATES PATENTS

| 2,815,233 | 12/1957 | Collins | 289—13 |
| 2,945,716 | 7/1960 | Collins | 289—14 |
| 3,140,109 | 7/1964 | Lee et al. | 289—14 |

FOREIGN PATENTS

| 110,312 | 10/1917 | Great Britain. |
| 497,474 | 12/1938 | Great Britain. |

DONALD W. PARKER, *Primary Examiner.*

ROBERT R. MACKEY, *Examiner.*

L. K. RIMRODT, *Assistant Examiner.*